United States Patent
Kaza et al.

(10) Patent No.: US 12,190,043 B2
(45) Date of Patent: Jan. 7, 2025

(54) AUTOMATED DOCUMENT TAGGING IN A DIGITAL MANAGEMENT PLATFORM

(71) Applicant: DocuSign, Inc., San Francisco, CA (US)

(72) Inventors: Shrinivas Kiran Kaza, Fremont, CA (US); Eric M. Zenz, Mercer Island, WA (US); Roshan Satish, Seattle, WA (US); Michael Anthony Palazzolo, Seattle, WA (US); Patrick Beukema, Seattle, WA (US); Kim Cuong Phung, Hayward, CA (US); Boon Sun Song, San Jose, CA (US); Taiwo Raphael Alabi, San Jose, CA (US)

(73) Assignee: Docusign, Inc., San Francisco, CA (US)

( * ) Notice: Subject to any disclaimer, the term of this patent is extended or adjusted under 35 U.S.C. 154(b) by 0 days.

(21) Appl. No.: 16/942,652

(22) Filed: Jul. 29, 2020

(65) Prior Publication Data
US 2022/0035990 A1    Feb. 3, 2022

(51) Int. Cl.
*G06F 40/117*    (2020.01)
*G06F 16/93*    (2019.01)
(Continued)

(52) U.S. Cl.
CPC ............ *G06F 40/117* (2020.01); *G06F 16/93* (2019.01); *G06F 18/214* (2023.01); *G06N 20/00* (2019.01); *G06V 30/414* (2022.01); *G06V 30/416* (2022.01)

(58) Field of Classification Search
CPC ..... G06F 40/117; G06F 16/93; G06K 9/6256; G06K 9/00469; G06K 9/00463; G06N 20/00; G06V 30/414; G06V 30/416
See application file for complete search history.

(56) References Cited

U.S. PATENT DOCUMENTS

| 7,149,347 | B1 * | 12/2006 | Wnek | G06K 9/00469 |
| | | | | 382/159 |
| 9,634,975 | B2 | 4/2017 | McCabe et al. | |

(Continued)

OTHER PUBLICATIONS

International Search Report and Written Opinion, Patent Cooperation Treaty Application No. PCT/US2021/040614, Aug. 5, 2021, 9 pages.

*Primary Examiner* — Sanchita Roy
(74) *Attorney, Agent, or Firm* — KDW Firm PLLC

(57) ABSTRACT

An auto-tagging engine receives a training set of data comprising documents including a set of tagged fields with each tagged field corresponding to a portion of the document. The auto-tagging engine trains a machine learned model using the training set of data. The trained machine learned model, when applied to a target document in a document management environment, identifies portions of the target document each corresponding to fields of the target document. For each field of the target document, the auto-tagging engine identifies text of the target document associated with the identified portions of the target document corresponding to fields. Natural language processing is performed on the identified text in order to identify field types for the fields. The target document is automatically modified to include a tag identifying the portion of the target document corresponding to each field and identifying a field type of the field.

19 Claims, 4 Drawing Sheets

(51) Int. Cl.
*G06F 18/214* (2023.01)
*G06N 20/00* (2019.01)
*G06V 30/414* (2022.01)
*G06V 30/416* (2022.01)

(56) References Cited

U.S. PATENT DOCUMENTS

| | | | |
|---|---|---|---|
| 10,430,570 | B2 | 10/2019 | Gonser et al. |
| 10,552,525 | B1 * | 2/2020 | Allison ................. G06Q 10/10 |
| 11,494,047 | B1 * | 11/2022 | Allison ............... G06F 3/04817 |
| 2011/0258150 | A1 * | 10/2011 | Neogi ...................... G06K 9/72 |
| | | | 706/12 |
| 2014/0123057 | A1 * | 5/2014 | Eigner ............... G06Q 30/0269 |
| | | | 715/780 |
| 2014/0223284 | A1 * | 8/2014 | Rankin, Jr. ........... G06F 40/186 |
| | | | 715/234 |
| 2020/0364451 | A1 * | 11/2020 | Ammar ............. G06K 9/00469 |
| 2021/0081837 | A1 * | 3/2021 | Polleri ................... G06N 5/022 |
| 2021/0133438 | A1 * | 5/2021 | Florencio ............ G06K 9/6257 |
| 2021/0182547 | A1 * | 6/2021 | Ayyadevara ........... G06K 9/325 |

* cited by examiner

FIG. 3

AUTOMATED DOCUMENT TAGGING IN A DIGITAL MANAGEMENT PLATFORM

TECHNICAL FIELD

The disclosure generally relates to the field of document tagging, and specifically to automated document tagging in a digital management platform.

BACKGROUND

An entity may provide or create a document for tagging within an online document management system (an "online document system"). Conventional online document systems enable the entity (i.e., a user of the online document system) to view and manually tag the document prior to sending the document to another party for completion and/or execution, but do not provide intelligent analyses of the document contents to automatically tag the document. To provide an improved and efficient document management experience for the user, there is a need for an auto-tagging engine that analyzes document content based on characteristics of the document, and automatically tags the document for the user based on this analysis.

SUMMARY

A method for automatically tagging a document within a document management environment is described herein. A training set of data that includes documents is accessed. In the training set, each document includes a set of tagged fields within the document, each corresponding to a portion of the document. A machine learned model is trained using the training set of data such that the trained machine learned model is configured to identify, for each of one or more fields within a document, a portion within the document corresponding to the field.

A target document to be auto-tagged is accessed, and the trained machine learned model is applied to the target document. The trained machine learned model identifies portions of the target document corresponding to fields of the target document. For each field of the target document, text of the target document is identified that is associated with the identified portion of the target document corresponding to the field. Natural language processing is performed on the identified text in order to identify a field type of the field. The target document is automatically modified to include a tag identifying the portion of the target document corresponding to the field and the identified field type of the field.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 3 illustrates an example interface in which an auto-tagged document may be presented to a user, in accordance with one or more embodiments.

DETAILED DESCRIPTION

Figure 1:
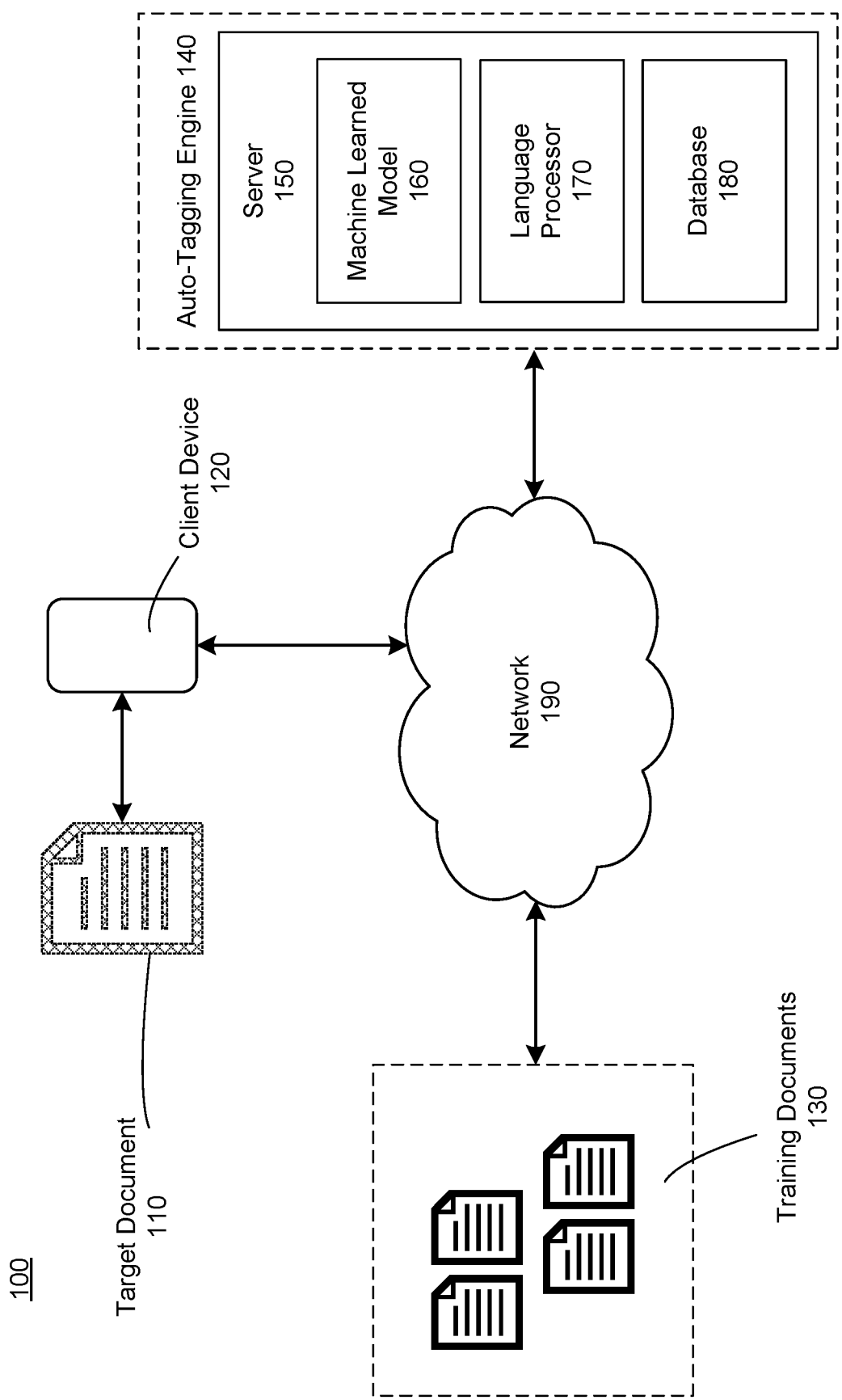
FIG. 1 illustrates an example document management environment in which fields within documents can be identified for auto-tagging, in accordance with one or more embodiments.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Document Management Environment Overview

The methods described herein use machine learning to auto-tag a document in a document management environment. The document management environment enables a party (e.g., individuals, organizations, etc.) to create and send documents to one or more receiving parties for negotiation, collaborative editing, electronic execution (e.g., electronic signature), automation of contract fulfilment, archival, and analysis. Within the document management environment, a receiving party may review content and/or terms presented in a digital document, and in response to agreeing to the content and/or terms, can electronically execute the document. In some embodiments, the receiving party completes and/or contributes to a portion of the content and/or terms in the document. The receiving party may complete (i.e., fill-in) one or more portions of a document in fields designated by the sending party. The fields may be designated by a tag that signifies to a user where information is to be filled in. Additionally, a field type may be provided for each tag identifying a type of information (e.g., date, initials, signature, etc.) to be filled in. Within the document management environment, the sending party may access and/or share data associated with the document such as a time and location at which the receiving party accesses, views, and/or executes the document. In some embodiments, the receiving and/or sending parties also have access to archival data of similar documents. In some embodiments, the document management environment enables payments between the receiving and sending parties. DocuSign, Inc's e-Signature product is an example of functionality that is implemented within a document management environment. A document management environment and example functionality are further described in U.S. Pat. No. 9,634,975, issued Apr. 25, 2017, and U.S. Pat. No. 10,430,570, issued Oct. 1, 2019, which are hereby incorporated by reference in their entireties.

The system environment described herein can be implemented within an online document system, a document management system, or any type of digital management platform. It should be noted that although description may be limited in certain contexts to a particular environment, this is for the purposes of simplicity only, and in practice the principles described herein can apply more broadly to the context of any digital management platform. Examples can include but are not limited to online signature systems, online document creation and management systems, collaborative document and workspace systems, online workflow management systems, multi-party communication and interaction platforms, social networking systems, marketplace and financial transaction management systems, or any suitable digital management platform.

The processes described herein automatically tags a document for a user. A tagged document includes at least one tag that identifies a portion of the document that corresponds to a field and includes the identified field type of the field. The document management environment inputs a target document to a machine learned model that identifies portions within the target document corresponding to fields of the target document. The machine learned model is trained on a training set of documents each with a set of tagged fields and is configured to identify portions of the target document corresponding to fields within the target document. For each identified field of the target document, text of the target document associated with (e.g., characters located within a threshold distance of) the portion of the target document corresponding to the field is identified. Natural language processing is performed on the identified text in order to identify the field type of the field. For example, natural language processing determines that identified text 'Applicant Signature:' is associated with a signature field type. The target document is automatically modified to include the tag identifying the portion of the target document corresponding to the field and the identified field type.

Conventional methods for tagging a document involve greater amounts of human involvement, are less efficient, and are less accurate. For example, a user uploads a document to a document management system and manually selects the locations of fields within that document for tagging. For each tag, the user would like to place within the document, the user has to select the tag (e.g., by clicking and dragging) from a tool bar and position the tag at the appropriate location within the document. For multi-page documents with many locations in need of unique tag types, the user may spend a significant amount of time manually tagging the document and may miss locations in need of tagging or place an incorrect tag at a particular location. Thus, by automating the tagging of fields while minimizing human involvement or intervention, the document management environment is able to improve the document tagging process.

FIG. 1 illustrates an example document management environment 100 in which fields within documents can be identified for auto-tagging, in accordance with one or more embodiments. As described above, the document management environment 100 enables a sending party to create and send digital documents for electronic completion and/or execution to one or more receiving parties. The receiving parties may review, modify, and execute the documents. The document management environment 100 uses a machine learned model to identify portions of a document that correspond to fields of the document prior to sending the document to the receiving party for execution. As illustrated in FIG. 1, the document management environment includes a target document 110 for auto-tagging, a client device 120, a set of training documents 130, and an auto-tagging engine 140, each communicatively interconnected via a network 190. In some embodiments, the document management environment includes components other than those described herein. For the purposes of concision, the web servers, data centers, and other components associated with an online document management environment are not shown in the embodiment of FIG. 1.

The target document 110 for auto-tagging is analyzed to identify portions of the target document (e.g., locations within the target document) corresponding to fields. Examples of target documents 110 for auto-tagging include but are not limited to: a sales contract, a permission slip, a rental and/or lease agreement, a liability waiver, a financial document, an investment term sheet, a purchase order, an employment agreement, a mortgage application, and so on. The auto-tagging engine 140 receives the target document 110 for auto-tagging from the sending party via the client device 120 (or receives instructions to create the target document 110 within the document management environment 100 from the client device 120) and provides it to the receiving party (not illustrated in the embodiment of FIG. 1), for instance, for completion and/or signing. It should be noted that although examples are given herein in the context of a single document, the document management environment 100 can coordinate the creation, viewing, editing, and signing of any number of documents (e.g., thousands, millions, and more) for any number of users or accounts, and for any number of entities or organizations.

The client device 120 enables the user to create and/or provide the target document 110 for auto-tagging to the auto-tagging engine 140. The client device 120 is a computing device capable of transmitting and/or receiving data over the network 190. The client device 120 may be a conventional computer (e.g., a laptop or a desktop computer), a cell phone, or a similar device. After the auto-tagging engine 140 automatically tags the target document 110, the client device 120 can generate and display to the user a modified target document including one or more tags and corresponding identified field types for each tag. In some embodiments, the user may provide feedback to the auto-tagging engine 140 via the client device 120. For example, the user may approve or reject the tags and corresponding identified field types automatically identified and placed by the auto-tagging engine 140.

The training documents 130 serve as a training set of information for training the machine learned model 160 to identify fields within a document and portions of the document that correspond to each field. The training documents 130 each include a set of tagged fields within the document. Each tagged field corresponds to a portion of the document (i.e., a location within the document) where the user fills in information corresponding to the field. In some embodiments, the tagged fields in a training document may be filled in with information, may not be filled in (i.e., left blank), or some combination thereof. In some embodiments, one or more users are responsible for creating and/or managing the training documents 130. For example, the users may manually curate and/or provide, to the auto-tagging engine 140, the set of tagged fields in the training documents 130. In some embodiments, the training set of data can include historical documents associated with the document management environment 100 that have been manually tagged.

The auto-tagging engine 140 automatically applies tags and field types to the target document 110 for auto-tagging using a machine learned model 160 and a language processor 170. In response to the machine learned model 160 identifying portions of the target document 110 corresponding to fields of the target document 110, the auto-tagging engine 140 tags the portions of the target document 110 corresponding to the fields. In response to the language processor 170 identifying a field type for each tagged field, the auto-tagging engine 140 modifies the tag for each field to include the field type. The auto-tagging engine 140 thus modifies the target document 110 by automatically tagging portions of the target document corresponding to fields of the target document and identifying, within the tags, the identified field types of each field. The auto-tagging engine 140 may require little to no user involvement in the automatic tagging of the target document. The auto-tagging engine 140 presents to the user, via the client device 120, the modified target document. In some embodiments, the auto-tagging engine 140 identifies tags and field types in more than one document. The auto-tagging engine 140 includes a server 150, which hosts and/or executes the machine learned model 160, the language processor 170, and a database 180.

The server 150 receives and stores information from the document management environment 100. The server 150 may be located on a local or remote physical computer and/or may be located within a cloud-based computing system. The server 150 accesses the target document 110 for auto-tagging, for instance by receiving it from the client device 120, by retrieving the document from storage associated with the document management environment 100, retrieving the document from storage independent of the document management environment 100, and the like. In some embodiments, the server 150 receives feedback from the user regarding a modified target document, for instance feedback manually approving or rejecting automatically tagged fields within the modified target document. In some embodiments, the server 150 is a document server, storing any number of documents within the environment 100, including the modified target document.

The machine learned model 160 is configured to identify, for each of one or more fields within the target document 110 for auto-tagging, a portion of the target document 110 that corresponds to the field. The machine learned model 160 is trained on a training set of data. The training set of data includes the training documents 130, each including the set of tagged fields. After being trained, the machine learned model 160 is applied to the target document 110. The machine learned model 160 then outputs information identifying one or more portions of the target document 110, each portion corresponding to a field. For example, the machine learned model 160 may output location coordinates of each field. The training and application of the machine learned model 160 is further discussed with respect to FIG. 2.

The language processor 170 identifies the text of the target document 110 for auto-tagging associated with the portions of the target document corresponding to fields identified by the machine learned model 160. The language processor 170 performs natural language processing on the identified text of the target document 110 to identify a field type associated with each field. In one embodiment, the language processor 170 uses a second machine learned model to identify the field type for each field. In these embodiments, the second machine learned model can be trained using the training documents 130, for instance if each training document 130 is tagged with tags that identify fields types of fields within the training document 130. In these embodiments, the second machine learned model can analyze text corresponding to fields within the training documents 130, and can learn correlations between the analyzed text and the fields types of the training documents 130, and can thus be configured to identify field types of fields within the target document 110 based on text corresponding to these fields within the target document 110. The application of the language processor 170 is further discussed with respect to FIG. 2.

The database 180 stores information relevant to the auto-tagging engine 140. The stored data includes, but is not limited to, the training set of information, the training documents 130, the target document 110 for auto-tagging, identified portions of the target document 110 associated with fields, text of the target document 110, a plurality of field types, identified field types associated with fields of the target document 110, feedback provided by users, and so on. The auto-tagging engine 140 can add any such information to the training set of information and can retrain the machine learned model 160 based on this information.

The network 190 transmits data within the document management environment 100. The network 190 may be a local area and/or wide area network using wireless and/or wired communication systems, such as the Internet. In some embodiments, the network 190 transmits data over a single connection (e.g., a data component of a cellular signal, or Wi-Fi, among others), and/or over multiple connections. The network 190 may include encryption capabilities to ensure the security of customer data. For example, encryption technologies may include secure sockets layers (SSL), transport layer security (TLS), virtual private networks (VPNs), and Internet Protocol security (IPsec), among others.

Data Flow of Auto-Tagging Engine

Figure 2:
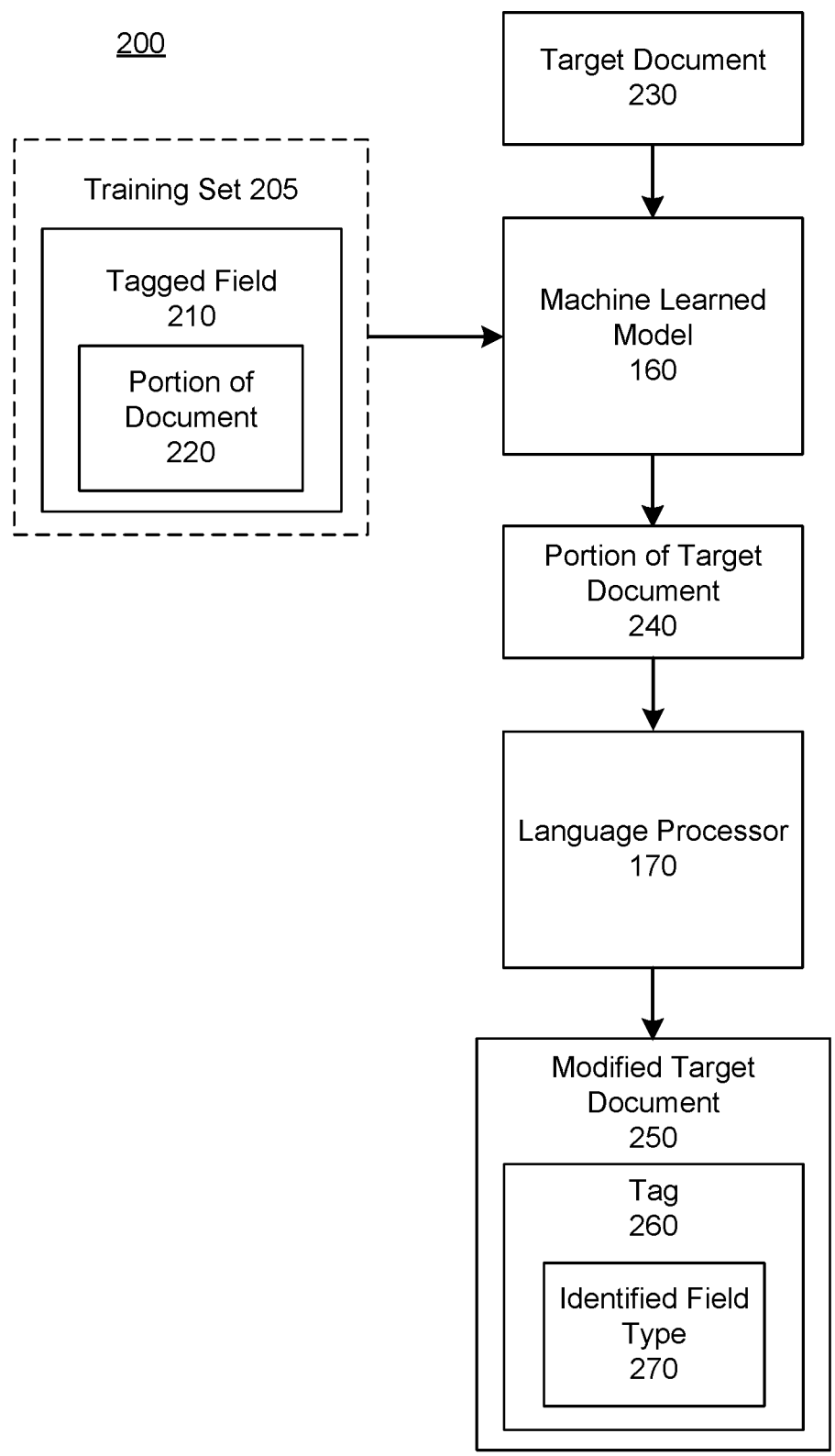
FIG. 2 illustrates data flow within an example auto-tagging engine, in accordance with one or more embodiments.

FIG. 2 illustrates data flow 200 within an example auto-tagging engine 140, in accordance with one or more embodiments. The auto-tagging engine 140 utilizes the machine learned model 160 and the language processor 170 to modify a target document 230 to include at least one tag 260 identifying a portion of the target document 240 corresponding to a field and identifying a field type 270 of the field. The target document 230 is any document with one or more pages that includes various characters (e.g., text, symbols, shapes, images, etc.). Examples of target documents 230 include but are not limited to: a sales contract, a permission slip, a rental and/or lease agreement, a liability waiver, a financial document, an investment term sheet, a purchase order, an employment agreement, a mortgage application, and so on. In one embodiment, the auto-tagging engine 140 accesses the target document 230 to be auto-tagged by receiving the target document 230 from a user of the auto-tagging engine 140. For example, the user uploads the target document 230 to the auto-tagging engine 140. In another embodiment, the user of the auto-tagging engine 140 generates the target document 230 within the auto-tagging engine 140. In some embodiments, the target document 230 is stored within the auto-tagging engine 140. In other embodiments, the target document 230 is provided to the auto-tagging engine 140 by a different document system.

The machine learned model 160 identifies portions of the target document 240 that correspond to fields of the target document 230. In one embodiment, the target document 230 may include only one portion 240 corresponding to one field. In other embodiments, the target document may include multiple portions 240 corresponding to multiple fields where each portion 240 is associated with one field. As described with respect to FIG. 1, the machine learned model 160 is trained to identify portions of a document corresponding to fields using a training set of data 205 (e.g., "the training set 205"). The training set 205 includes documents, each including a set of tagged fields 210. A tagged field 210 is an indication, a classification, or a modification of a portion of a document where information can or needs to be added by one or more users (for instance, prior to and/or during execution of the document). The tagged field 210 is associated with a location within the document corresponding to a field and identifies a field type of the field. A tagged field 210 can include visual indicators, such as a box surrounding the field, a circle surrounding the field, a highlight applied to the field, a text box located adjacent to the field, a change of font size, color, or emphasis of the field, or some combination thereof. A field may include a space to fill in text, a radio button to select or de-select, a checkbox to check or un-check, a dropdown box to select from a list of options, and so on. Each tagged field 210 is located at a specific location within the document (i.e., at a portion of the document 220). In some embodiments, a document of the training set 205 may include a plurality of tagged fields 210, each corresponding to a different portion of the document 220. In some embodiments, the tagged fields 210 may be filled in, while in other embodiments, the tagged fields 210 may be blank or un-filled.

The auto-tagging engine 140 uses supervised or unsupervised machine learning to train the machine learned model 160 using the training set 205. Different machine learning techniques may be used in various embodiments, such as linear support vector machines (linear SVM), boosting for other algorithms (e.g., AdaBoost), neural networks, logistic regression, naïve Bayes, memory based learning, random forests, bagged trees, decision trees, boosted trees, or boosted stumps.

In one embodiment, the machine learned model 160 may use a combination of object recognition (e.g., optical character recognition (OCR)) and object detection (e.g., computer vision object detection) to detect the tagged fields 210 in the documents of the training set 205 during training. In one embodiment, object recognition and object detection processes run in parallel (i.e., run simultaneously) on a document. The object recognition identifies characters (i.e., text, shapes, images, patterns, lines, etc.) within a document and a location for each character (e.g., a location coordinate or set of location coordinates) within the document. The object detection identifies characters of the document that correspond to and are commonly associated with a field. The characters commonly associated with a field may include shapes (e.g., a long horizontal line, a square, a circle, a rectangle, a blank space, etc.). For example, a training document can include a square shape within the training document corresponding to a field (such as a checkbox field). The machine learned model 160 can learn to correlate square shapes within documents with fields such that when a similar shape is detected in a target document 230, the machine learned model 160 can identify the square within the target document 230 as a field.

The training of the machine learned model 160 helps the machine learned model 160 identify one or more portions of the document 220 corresponding to one or more tagged fields 210 within a training document. In other words, training the machine learned model 160 enables the machine learned model 160 to identify the relationships between fields of a document and a portion or a location of a document that includes or that is representative of the fields.

The trained machine learned model 160, when applied to a target document 230, identifies portions of target document 240 corresponding to fields of the target document 230. In one embodiment, the trained machine learned model 160 may use object recognition and object detection to identify portions of the target document 240 corresponding to fields. As described earlier, object recognition and object detection may be run simultaneously on a target document 230. Through object recognition, the characters of the target document 230 are identified along with a location of each character. Through object detection, the characters commonly associated with a field are detected within the target document 230. In such embodiments, the machine learned model 160, when applied to the contents of the target document 230, identifies portions of the target document 240, based on the contents of the target document, that correspond to fields within the target document. The machine learned model 160, without explicit user involvement, automatically identifies the locations of fields (i.e., locations where tags will need to be placed) within the target document 240. The identification of field locations for tagging by the machine learned model 160 may be performed more accurately and more efficiently than conventional document tagging methods described above.

In some embodiments, a bounding box may be generated that includes all of the characters associated with an identified field. The bounding box is associated with location coordinates corresponding to the portion of the document that includes the identified field. The location coordinates may include a starting coordinate and an ending coordinate. In some embodiments, the auto-tagging system 140 detects overlapping location coordinates for the bounding boxes (i.e., overlapping bounding boxes) of the target document 230. An overlapping bounding box includes a starting coordinate or an ending coordinate that is located at or between the starting coordinate and the ending coordinate of another bounding box. The auto-tagging system 140 removes all but one of the over-lapping bounding boxes based on a set of predetermined rules. The predetermined rules may be based on object recognition and object detection processes. For example, the predetermined rules may include rules that: remove all but one over-lapping bounding box when the characters located within the over-lapping bounding boxes are identical, and remove all but one over-lapping bounding box where the characters located within the bounding boxes do not include the entire field.

For each field identified by the machine learned model 160, the language processor 170 identifies characters (e.g., text) associated with the identified portions of the target document 240 corresponding to the fields. In one embodiment, the identified characters that correspond to the identified portions of the target document 240 may be characters located within the identified portion of the target document 240, and/or characters located within a threshold distance of the identified portions of the target document 240. In another embodiment, the identified characters that correspond to an identified portion of the target document 240 may be characters located within a bounding box and/or characters located within a threshold distance of the bounding box. In one example implementation, the language processor 170 identifies the characters 'y', 'e', and 's' which are located in close proximity to a field (e.g., a circle) that was identified by the machine learned model 160.

The language processor 170 performs natural language processing on the identified characters to identify a field type for each field. The language processor 170 automatically identifies the field type for each field, without requiring manual involvement or direction by a user. The identification of the field type performed by the language processor 170 beneficially enables the appropriate tag to be placed at the field. In one embodiment, the natural language processing may be performed by training and applying a second machine learned model to identify field types based on text associated or corresponding to a field. In another embodiment, the natural language processing may be performed using a heuristic solution (e.g., lookup tables, library, database, etc.). In a machine learned implementation of the natural language processor, the identified text is compared to previous examples of identified text with corresponding field types (for instance, within the training set 205). Based on the comparison, the natural language processor determines a field type for the identified text of the target document. In a heuristic solution implementation of the natural language processor, the identified text is compared to a listing (or table) of text with associated field type. Based on the comparison, the natural language processor determines the field type for the identified text of the target document. An identified field type may include a text field, a radio button field, a signature field, an initial field, a date field, and a date signed field. In the same example implementation with the characters 'y', 'e', and 's' and the circle shape (the field), natural language processing determines that these specific characters (i.e., 'y', 'e', 's' and a circle shape) are commonly associated with a radio button field, and that the options for the radio button field are "yes" and "no".

In one embodiment, the identified field type is a text field and the auto-tagging system 140 modifies the target document to include an identification of text to be entered by a user in the text field based on a field sub-type of the text field. For example, the field sub-type of the text field may include a name, an address, a title, a date, a company name, or a dollar amount. In another example implementation, the characters 't', 'i', 't', 'l', 'e', and ':' are associated with an identified portion of the target document 240 (i.e., a blank space), and the language processor 170 determines that these specific characters are commonly associated with a text field and a "title" field sub-type.

The modified target document 250 is displayed to the user via the client device 120. The modified target document 250 includes a tag 260 identifying the portion of the target document corresponding to the field and an identified field type 270 of the field. The tag 260 may include visual indicators identifying the location of the field, such as a box, a circle, a highlight, change of font color, etc. The identified field type 270 may be displayed to the user as the user clicks on or selects the tag 260 or hovers a cursor over the tag 260.

In some embodiments, the user may participate in the automatic tagging process by providing feedback regarding the modified target document 250. For example, the user may provide approval of the modified target document 250. The approval may signify to the auto-tagging engine 140 that the modified target document 250 is ready to be sent to a receiving party in the document management environment. In another example, the user may delete one or more of the tags 260 (for instance, in embodiments where the automatic tag is incorrect, or in embodiments where the user does not want the tag to be present) and/or update one or more of the tags 260 (for instance, in embodiments where the user wants to move a location of the tag, change a field type of the tag, and the like). The auto-tagging engine 140 can subsequently retrain the machine learned model 160 based on the user feedback.

Example Presentation of Tagged Document within Document Management Environment

Figure 3:
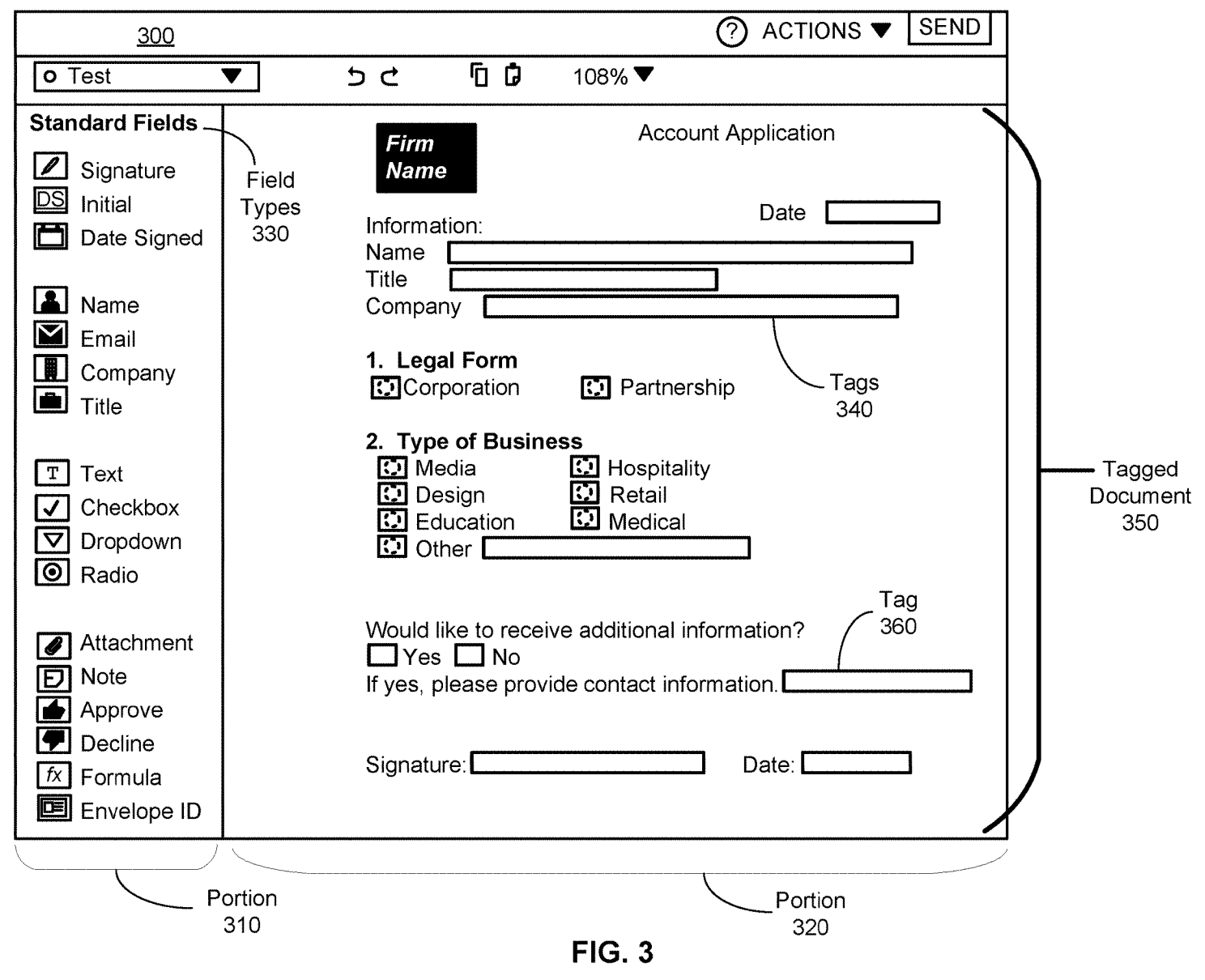

FIG. 3 illustrates an example interface 300 in which an auto-tagged document may be presented to a user, in accordance with one or more embodiments. After identifying a plurality of tags and associated field types within a target document 110 for auto-tagging, the auto-tagging engine 140 modifies the target document 110 to include each tag and field type and presents the modified target document (i.e., a tagged document 350) to the user of the client device 120.

In an interface portion 310 of the interface 300, a listing of field types 330 are presented to the user. The listing of field types 330 includes both field types and field sub-types. For example, in the portion 310 of the interface 300, the listing of field types 330 includes a signature field, an initial field, a date signed field, a name field sub-type, an email field sub-type, a company field sub-type, a title filed sub-type, a text field, a checkbox field, a dropdown field, a radio button field, an attachment field, a note field, an approve button field, a decline button field, a formula field, and an envelope ID field. In some embodiments, the listing of field types 330 may include more than or less than the field types 330 illustrated in FIG. 3.

In an interface portion 320 of the interface 300, the tagged document 350 is displayed to the user. The tagged document includes various tags 340. In this example implementation, the tags 340 are illustrated as boxes around the fields (i.e., boxes encompassing portions of the document that need to be filled in by the user). In one embodiment, the field type 330 associated with each tag is displayed to the user without any user input. In this embodiment, the field type 330 may be displayed within the tag 340 or to next to the tag 340 in the interface 300. In another embodiment, as a user selects (e.g., by clicking on, by hovering a cursor over, etc.) a tag 340, the field type 330 may be displayed to the user within the tag 340 or within a proximity of the tag 340 in the interface portion 320.

Examples of tags within the embodiment of FIG. 3 include a date tag, a name tag, a title tag, and a company tag (each being a "text box" field type); a "legal form" pair of tags (each being a "checkbox" field type); a set of "type of business" tags (being a combination of checkbox field types and text box field types); a "would you like to receive additional information" set of fields (being a combination of checkbox field types and text box field types); and a "signature" and "date signed" set of fields (being of the "signature" and "date signed" field types, respectively). It should be noted that each individual field within the embodiment of FIG. 3 does not include a separate reference number for the purposes of the simplicity only.

In some embodiments, the interface 300 of the client device 120 enables the user to provide feedback on the automatically tagged tags 340 of the document 350. A user may edit, add, and/or delete any or all of the tags 340 and/or field types 330. For example, a tag 360 may be associated with a text field and the user may decide to adjust the tag 360 to be an "email" field sub-type. The user may select the tag 360 (e.g., by clicking on the tag 360), and selecting an interface element corresponding to editing the field type 330 (not shown in FIG. 3).

Process for Auto-Tagging a Document

Figure 4:
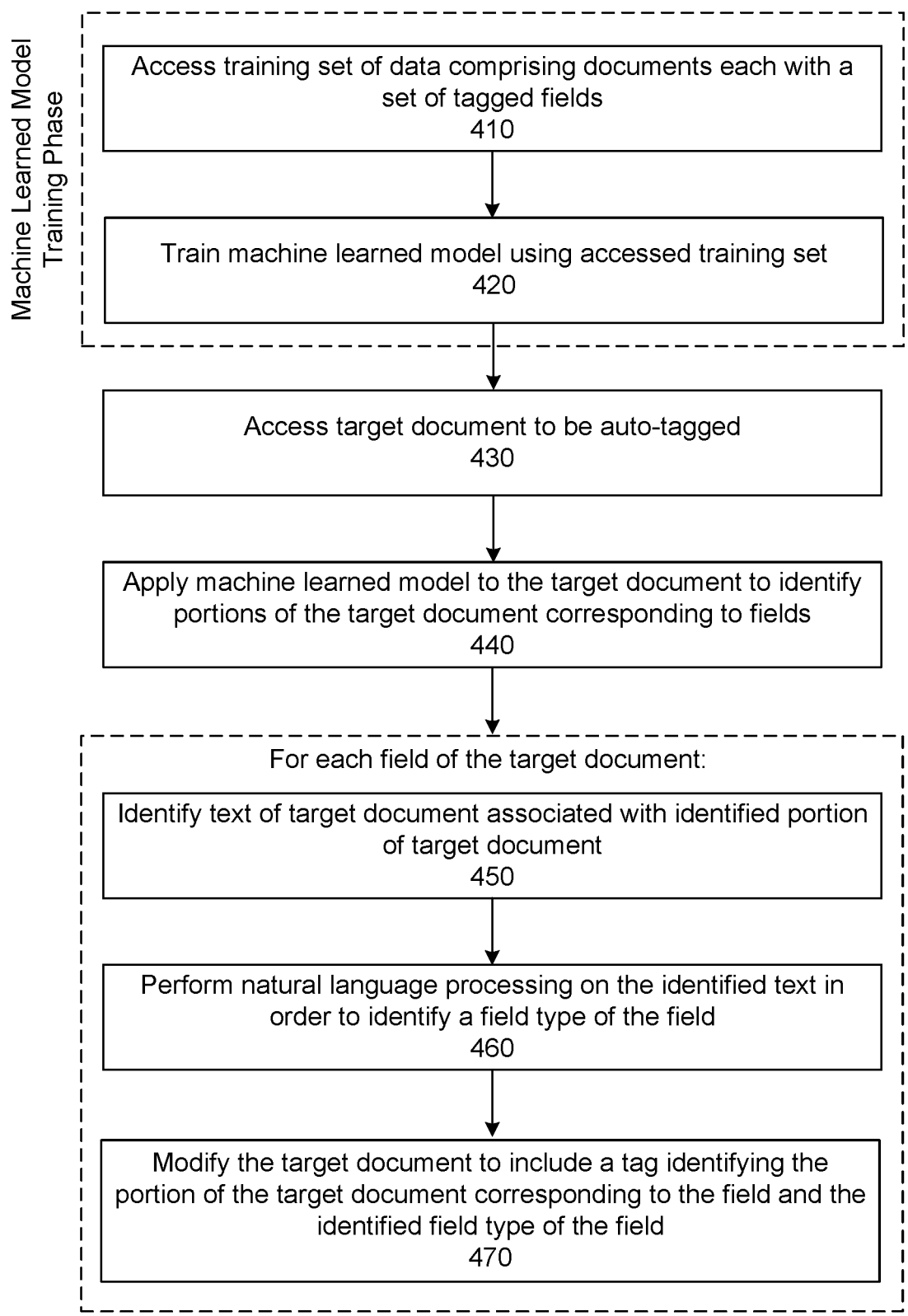
FIG. 4 illustrates an example process for auto-tagging a document, in accordance with one or more embodiments.

FIG. 4 illustrates an example process for auto-tagging a document within a document management environment, in accordance with one or more embodiments. This example process may be more accurate and more efficient than manual document tagging processes as described above.

An auto-tagging engine of the document management environment accesses 410 a training set of data including (for example) training documents each with a set of tagged fields. Each tagged field corresponds to a portion of the document. As noted above, a tagged field is a fillable location within the document (i.e., a location where a user fills in information). The tagged field may include one of a radio button, a check box, a dropdown menu, a blank space for filling in text, or some other fillable tagged field. Each tagged field is located at a particular location within the document (i.e., at a portion of the document). The tagged field may be tagged and/or designated by a visual indicator (e.g., a box surrounding the field, a circle surrounding the field, etc.), by a highlight, by a change in font (i.e., the field is a different font color compared to the rest of the document), and so on.

The auto-tagging engine trains 420 a machine learned model using the training set of data. The machine learned model is configured to identify, for each of one or more fields within a document, a portion within the document corresponding to the field, for instance based on correlations between content of training documents and the tagged fields within the training documents. In one example, the machine learned model may be a convolutional neural network. The machine learned model may utilize object recognition (e.g., OCR) and object detection (e.g., computer vision object detection) to identify characters (e.g., text) and character locations associated with tagged fields during training, and can apply these operations when identifying field locations and field types when applied to a target document.

The auto-tagging engine accesses 430 a target document to be auto-tagged. For instance, the target document may be a contract or employment agreement uploaded to the document management environment by a client device. Likewise, the target document may be created and collaboratively modified within the document management environment by a number of entities. The target document to be auto-tagged may be associated with an organization and/or a customer account within the document management environment. The auto-tagging engine accesses the target document to be auto-tagged by receiving, generating, and/or accessing a stored target document within the document management environment. In some embodiments, the auto-tagging engine accesses the target document to be auto-tagged by accessing a stored target document within a document system separate from the auto-tagging engine.

The auto-tagging engine applies 440 the machine learning model to the target document to identify portions of the target document corresponding to fields of the target document. In one embodiment, the machine learning model utilizes object recognition and object detection processes to determine portions of the target document that correspond to fields. For example, the machine learning model identifies all characters, a character location for each character, and identification of characters typically associated with fields. The machine learning model analyzes this information and determines portions of the target document that correspond to fields. In one embodiment, the machine learned model generates a bounding box for each field of the target document. The bounding box is located at particular location coordinates within the target document and encompasses the field of the target document.

The auto-tagging engine, for each field of the target document, identifies 450 text of the target document associated with the identified portion of the target document corresponding to the field. For example, the auto-tagging engine identifies characters (e.g., text) located within a threshold distance to a location of the portion of the target document (i.e., within a threshold distance of a field). In another example, the auto-tagging engine may identify characters located within a threshold distance of the bounding box. In some embodiments, the auto-tagging system detects over-lapping bounding boxes where the location coordinates of one bounding box overlap with the location coordinates of another bounding box. For example, a starting coordinate or an ending coordinate of one bounding box is located at or between a starting coordinate or an ending coordinate of another bounding box. All but one of the over-lapping bounding boxes may be removed based on predetermined rules.

The auto-tagging engine, for each field of the target document, performs 460 natural language processing on the identified text in order to identify a field type of the field. In one embodiment, natural language processing may be machine learned. In another embodiment, natural language processing may include a heuristic solution (e.g., lookup tables). The natural language processing classifies the field with a field type based on a comparison of the identified text with possible field types. In a machine learned implementation of the natural language processor, the identified text is compared to previous examples of identified text with corresponding field types. Based on the comparison, the natural language processor determines a field type for the identified text of the target document. In a heuristic solution implementation of the natural language processor, the identified text is compared to a listing (or table) of text with associated field type. Based on the comparison, the natural language processor determines the field type for the identified text of the target document.

The auto-tagging engine, for each field of the target document, modifies 470 the target document to include a tag identifying the portion of the target document corresponding to the field and the identified field type of the field. The tag indicates to the user locations within the target document that need to be filled in. The identified field type designates to the user of the auto-tagging engine what information needs to be filled in by the user or a separate user (e.g., a receiving party). An identified field type may include a text field, a radio button field, a signature field, an initial field, a date field, and a date signed field. In one embodiment, the identified field type is a text field and the auto-tagging engine modifies the target document to include an identification of text to be entered by a user in the text field based on a field sub-type of the text field. For example, the field sub-type of the text field may include a name, an address, a title, a date, a company name, or a dollar amount.

It should be noted that although the example of FIG. 4 is described in the context of a target document, in practice, the process of FIG. 4 can be applied to a plurality of target documents associated with one or more user accounts and/or one or more organizations or entities.

Additional Configuration Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like.

Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method for automatically tagging fields of a target document, comprising:
    applying a machine learned model to the target document to identify portions of the target document corresponding to the fields of the target document, wherein the machine learned model has been trained using a training set of data comprising documents each with a set of tagged fields within a document, each tagged field corresponding to a portion of the document, wherein the tagged fields include at least one of: a tagged field for entering data at a predetermined location in the document, a blank tagged field at another predetermined location in the document, and any combination thereof, wherein the machine learned model configured to identify, for each of one or more fields within the document, a portion within the document corresponding to the field; and
    for each field of the target document:
        identifying text of the target document associated with the identified portion of the target document corresponding to the field;
        performing natural language processing on the identified text to identify a field type of the field of a plurality of types of fields; and
        automatically modifying viewable content of the target document to include a tag, wherein the tag identifies a location in the target document corresponding to the field and the identified field type of the field, wherein the tag visually indicates to a user to further modify the document within the field, a visual indicator associated with the tag varies in accordance with the identified field type of the field, the plurality of types of fields including one or more fields that accept textual input and one or more fields that do not accept textual input; and
    modifying, using the tag, the document by at least one of the following: entering data within the field corresponding to the tag, modifying the tag, and any combination thereof.

2. The method of claim 1, wherein the machine learned model is configured to:
    identify a bounding box for each field of the target document, the bounding box associated with location coordinates identifying a location of the bounding box within the target document;
    wherein identifying text of the target document associated with the identified portion of the target document corresponding to the field comprises:
        identifying characters within the target document and a character location for each character in the target document; and
        determining, based on the character locations, the characters located within a threshold distance of the location coordinates of the bounding box.

3. The method of claim 2, wherein the location coordinates include a starting coordinate and an ending coordinate for each bounding box, and the method further comprising:
    detecting over-lapping location coordinates for the bounding boxes of the target document, wherein the overlapping location coordinates for one bounding box comprises either a starting coordinate or an ending coordinate that is located at or between the starting coordinate and the ending coordinate of another bounding box; and
    removing all but one of the bounding boxes with overlapping location coordinates based on a set of predetermined rules.

4. The method of claim 1, wherein one or more of the identified field types is a text field, and for each text field of the target document:
    automatically modifying the target document to include an identification of text to be entered by a user in the text field based on a field sub-type of the text field.

5. The method of claim 1, wherein the target document is accessed by:
    receiving the target document to be auto-tagged from a user of a document management system;
    generating the target document to be auto-tagged within the document management system;
    accessing the target document to be auto-tagged, the target document stored within the document management system; or
    accessing the target document to be auto-tagged from a document system different than the document management system.

6. The method of claim 1, further comprising:
    providing, to a device of a user, the modified target document; and
    receiving, from the device of the user, feedback including at least one of: approval of the modified target document, deletion of one or more tags included in the modified target document, an update to one or more field types, and an update to one or more tags.

7. A non-transitory computer readable storage medium comprising computer executable instructions for automatically tagging fields of a target document that when executed by one or more processors causes the one or more processors to:

apply a machine learned model to the target document to identify portions of the target document corresponding to the fields of the target document, wherein the machine learned model has been trained using a training set of data comprising documents each with a set of tagged fields within a document, each tagged field corresponding to a portion of the document, wherein the tagged fields include at least one of: a tagged field for entering data at a predetermined location in the document, a blank tagged field at another predetermined location in the document, and any combination thereof, wherein the machine learned model configured to identify, for each of one or more fields within the document, a portion within the document corresponding to the field; and for each field of the target document:
identify text of the target document associated with the identified portion of the target document corresponding to the field;
perform natural language processing on the identified text to identify a field type of the field of a plurality of types of fields; and
automatically modify viewable content of the target document to include a tag, wherein the tag identifies a location in the target document corresponding to the field and the identified field type of the field, wherein the tag visually indicates to a user to further modify the document within the field, a visual indicator associated with the tag varies in accordance with the identified field type of the field, the plurality of types of fields including one or more fields that accept textual input and one or more fields that do not accept textual input;
modify, using the tag, the document by at least one of the following: entering data within the field corresponding to the tag, modifying the tag, and any combination thereof.

8. The non-transitory computer readable storage medium of claim 7, wherein the machine learned model is configured to:
identify a bounding box for each field of the target document, the bounding box associated with location coordinates identifying a location of the bounding box within the target document;
wherein identifying text of the target document associated with the identified portion of the target document corresponding to the field comprises:
identifying characters within the target document and a character location for each character in the target document; and
determining, based on the character locations, the characters located within a threshold distance of the location coordinates of the bounding box.

9. The non-transitory computer readable storage medium of claim 8, wherein the location coordinates include a starting coordinate and an ending coordinate for each bounding box, and wherein the one or more processors are configured to:
detect over-lapping location coordinates for the bounding boxes of the target document, wherein the over-lapping location coordinates for one bounding box comprises either a starting coordinate or an ending coordinate that is located at or between the starting coordinate and the ending coordinate of another bounding box; and
remove all but one of the bounding boxes with over-lapping location coordinates based on a set of predetermined rules.

10. The non-transitory computer readable storage medium of claim 7, wherein each identified field type includes at least one of: a textfield, a radio button field, a signature field, an initial field, a date field, and a date signed field.

11. The non-transitory computer readable storage medium of claim 7, wherein one or more of the identified field types is a text field, and wherein the one or more processors are configured to:
automatically modify the target document to include an identification of text to be entered by a user in the text field based on a field sub-type of the text field.

12. The non-transitory computer readable storage medium of claim 11, wherein the field sub-type of the one or more text fields includes one of: a name, an address, a title, a date, a company name, and a dollar amount.

13. The non-transitory computer readable storage medium of claim 7, the target document is accessed by:
receiving the target document to be auto-tagged from a user of a document management system;
generating the target document to be auto-tagged within the document management system;
accessing the target document to be auto-tagged, the target document stored within the document management system; or
accessing the target document to be auto-tagged from a document system different than the document management system.

14. The non-transitory computer readable storage medium of claim 7, wherein the one or more processors are configured to:
provide, to a device of a user, the modified target document; and
receive, from the device of the user, feedback including at least one of: approval of the modified target document, deletion of one or more tags included in the modified target document, an update to one or more field types, and an update to one or more tags.

15. A computer system for automatically tagging fields of a target document comprising:
one or more processors; and
a non-transitory computer readable storage medium comprising computer executable instructions that when executed by one or more processors causes the one or more processors to:
apply a machine learned model to the target document to identify portions of the target document corresponding to the fields of the target document, wherein the machine learned model has been trained using a training set of data comprising documents each with a set of tagged fields within a document, each tagged field corresponding to a portion of the document, wherein the tagged fields include at least one of: a tagged field for entering data at a predetermined location in the document, a blank tagged field at another predetermined location in the document, and any combination thereof, wherein the machine learned model configured to identify, for each of one or more fields within the document, a portion within the document corresponding to the field; and for each field of the target document:
identify text of the target document associated with the identified portion of the target document corresponding to the field;
perform natural language processing on the identified text to identify a field type of the field of a plurality of types of fields; and automatically modify viewable content of the target document to include a tag, wherein the tag identifies a location in the target document corresponding to the field and the identified field type of the field, wherein the tag visually indicates to a user to further modify the document within the field, a visual indicator associated with the tag varies in accordance with the identified field type of the field, the plurality of types of fields including one or more fields that accept textual input and one or more fields that do not accept textual input; and modify, using the tag, the document by at least one of the following: entering data within the field corresponding to the tag, modifying the tag, and any combination thereof.

16. The computer system of claim 15, wherein the machine learned model is configured to:

identify a bounding box for each field of the target document, the bounding box associated with location coordinates identifying a location of the bounding box within the target document;

wherein identifying text of the target document associated with the identified portion of the target document corresponding to the field comprises:

identifying characters within the target document and a character location for each character in the target document; and determining, based on the character locations, the characters located within a threshold distance of the location coordinates of the bounding box.

17. The computer system of claim 16, wherein the location coordinates include a starting coordinate and an ending coordinate for each bounding box, and wherein the one or more processors are configured to:

detect over-lapping location coordinates for the bounding boxes of the target document, wherein the over-lapping location coordinates for one bounding box comprises either a starting coordinate or an ending coordinate that is located at or between the starting coordinate and the ending coordinate of another bounding box; and remove all but one of the bounding boxes with over-lapping location coordinates based on a set of predetermined rules.

18. The method of claim 1, wherein performing natural language processing on the identified text to identify a field type of each field comprises applying text associated with or corresponding to the field to a further machine learned model that is trained to output the field type.

19. The method of claim 1, wherein the identified field type of each tag is displayed responsive to detecting a user interaction in relation to the tag.

* * * * *